US008969231B2

(12) United States Patent
Rytter et al.

(10) Patent No.: US 8,969,231 B2
(45) Date of Patent: Mar. 3, 2015

(54) FISCHER-TROPSCH CATALYSTS

(75) Inventors: Erling Rytter, Trondheim (NO); Sigrid Eri, Ranheim (NO); Rune Myrstad, Jakobsli (NO); Odd Asbjørn Lindvåg, Trondheim (NO)

(73) Assignee: GTL.FI AG, Zurich (CH)

( * ) Notice: Subject to any disclaimer, the term of this patent is extended or adjusted under 35 U.S.C. 154(b) by 200 days.

(21) Appl. No.: 13/378,581

(22) PCT Filed: Aug. 31, 2010

(86) PCT No.: PCT/GB2010/001647
§ 371 (c)(1),
(2), (4) Date: Mar. 1, 2012

(87) PCT Pub. No.: WO2011/027104
PCT Pub. Date: Mar. 10, 2011

(65) Prior Publication Data
US 2012/0149787 A1   Jun. 14, 2012

(30) Foreign Application Priority Data

Sep. 1, 2009  (GB) .................................. 0915207.5

(51) Int. Cl.
| | | |
|---|---|---|
| *B01J 38/04* | (2006.01) | |
| *B01J 38/06* | (2006.01) | |
| *B01J 38/10* | (2006.01) | |
| *B01J 38/12* | (2006.01) | |
| *B01J 38/16* | (2006.01) | |
| *B01J 23/00* | (2006.01) | |
| *B01J 23/02* | (2006.01) | |
| *B01J 23/08* | (2006.01) | |
| *B01J 23/10* | (2006.01) | |
| *B01J 23/32* | (2006.01) | |
| *B01J 23/40* | (2006.01) | |
| *B01J 23/42* | (2006.01) | |
| *B01J 23/44* | (2006.01) | |
| *B01J 23/56* | (2006.01) | |
| *B01J 23/58* | (2006.01) | |
| *B01J 23/60* | (2006.01) | |
| *B01J 23/70* | (2006.01) | |
| *B01J 23/74* | (2006.01) | |
| *B01J 20/00* | (2006.01) | |
| *B01J 21/04* | (2006.01) | |
| *B01J 23/89* | (2006.01) | |
| *B01J 23/75* | (2006.01) | |
| *B01J 23/80* | (2006.01) | |
| *B01J 23/889* | (2006.01) | |
| *B01J 35/10* | (2006.01) | |
| *B01J 37/02* | (2006.01) | |
| *B01J 37/10* | (2006.01) | |
| *B01J 37/12* | (2006.01) | |
| *B01J 37/14* | (2006.01) | |
| *B01J 37/16* | (2006.01) | |
| *B01J 37/18* | (2006.01) | |
| *C10G 2/00* | (2006.01) | |

(52) U.S. Cl.
CPC .............. *B01J 23/8913* (2013.01); *B01J 21/04* (2013.01); *B01J 23/75* (2013.01); *B01J 23/80* (2013.01); *B01J 23/8896* (2013.01); *B01J 23/894* (2013.01); *B01J 23/8953* (2013.01); *B01J 35/1019* (2013.01); *B01J 35/1038* (2013.01); *B01J 35/1042* (2013.01); *B01J 37/0205* (2013.01); *B01J 37/0207* (2013.01); *B01J 37/10* (2013.01); *B01J 37/12* (2013.01); *B01J 37/14* (2013.01); *B01J 37/16* (2013.01); *B01J 37/18* (2013.01); *C10G 2/331* (2013.01); *C10G 2/332* (2013.01); *C10G 2/342* (2013.01); *C10G 2300/703* (2013.01); *Y10S 502/524* (2013.01)
USPC ................... 502/34; 502/38; 502/51; 502/53; 502/55; 502/302; 502/303; 502/324; 502/326; 502/327; 502/328; 502/329; 502/332; 502/333; 502/334; 502/335; 502/336; 502/337; 502/338; 502/339; 502/355; 502/415; 502/439; 502/524

(58) Field of Classification Search
USPC ........... 502/34, 38, 51, 53, 55, 302, 303, 324, 502/326–329, 332–339, 355, 415, 439, 524
See application file for complete search history.

(56) References Cited

U.S. PATENT DOCUMENTS 1,746,464 A   2/1930   Fischer et al.
2,102,851 A  12/1937   La Brie
(Continued)

FOREIGN PATENT DOCUMENTS

EP   0042471   3/1981
EP   0296726   6/1988
(Continued)

OTHER PUBLICATIONS

Compressed Air and Gas Institute (What is Clean, Dry Air?) TAP #106, published Nov. 1, 2005.
(Continued)

*Primary Examiner* — Cam N. Nguyen
(74) *Attorney, Agent, or Firm* — Patterson Thuente Pedersen, P.A.

(57) ABSTRACT

A method of producing an alumina-supported cobalt catalyst for use in a Fischer-Tropsch synthesis reaction, which comprises: calcining an initial γ-alumina support material at a temperature to produce a modified alumina support material; impregnating the modified alumina support material with a source of cobalt; calcining the impregnated support material, activating the catalyst with a reducing gas, steam treating the activated catalyst, and activating the steam treated catalyst with a reducing gas.

33 Claims, No Drawings

(56) References Cited

U.S. PATENT DOCUMENTS

| | | |
|---|---|---|
| 2,548,159 A | 4/1951 | Houtman et al. |
| 2,666,756 A | 1/1954 | Thomas et al. |
| 2,830,877 A | 4/1958 | Appell |
| 2,916,356 A | 12/1959 | Keith et al. |
| 2,982,793 A | 5/1961 | Turner et al. |
| 2,987,487 A | 6/1961 | Stevens et al. |
| 3,025,248 A | 3/1962 | Rosinski |
| 3,068,303 A | 12/1962 | Pattison |
| 3,108,888 A | 10/1963 | Bugosh |
| 3,141,742 A | 7/1964 | Dye et al. |
| 3,235,515 A | 2/1966 | Earl |
| 3,270,059 A | 8/1966 | Siegfried Winderl et al. |
| 3,331,787 A | 7/1967 | Keith et al. |
| 3,344,196 A | 9/1967 | Hubert et al. |
| 3,397,154 A | 8/1968 | Herbert |
| 3,403,111 A | 9/1968 | Colgan et al. |
| 3,407,149 A | 10/1968 | Taylor et al. |
| 3,423,194 A | 1/1969 | Kearby |
| 3,437,586 A | 4/1969 | Weisz |
| 3,441,251 A | 4/1969 | Burns |
| 3,565,830 A | 2/1971 | Keith et al. |
| 3,591,649 A | 7/1971 | Kroll et al. |
| 3,692,701 A | 9/1972 | Box et al. |
| 3,751,508 A | 8/1973 | Fujiso et al. |
| 3,825,504 A | 7/1974 | Hilfman |
| 3,840,471 A | 10/1974 | Acres |
| 3,853,790 A | 12/1974 | Vosolsobe et al. |
| 3,876,557 A | 4/1975 | Bland et al. |
| 3,881,696 A | 5/1975 | Lepeytre et al. |
| 3,883,444 A | 5/1975 | Maselli et al. |
| 3,933,883 A | 1/1976 | Parthasarathy et al. |
| 3,966,640 A | 6/1976 | Katz et al. |
| 3,988,263 A | 10/1976 | Hansford |
| 4,049,582 A | 9/1977 | Erickson et al. |
| 4,055,513 A | 10/1977 | Wheelock |
| 4,065,484 A | 12/1977 | Dobashi |
| 4,080,390 A | 3/1978 | Imamura |
| 4,088,608 A | 5/1978 | Tanaka et al. |
| 4,102,777 A | 7/1978 | Wheelock |
| 4,102,822 A | 7/1978 | Mulaskey |
| 4,191,664 A | 3/1980 | McArthur |
| 4,200,552 A | 4/1980 | Noguchi et al. |
| 4,219,444 A | 8/1980 | Hill et al. |
| 4,233,186 A | 11/1980 | Duprez et al. |
| 4,237,030 A | 12/1980 | Noguchi et al. |
| 4,247,730 A | 1/1981 | Brunelle |
| 4,285,837 A | 8/1981 | Sato et al. |
| 4,368,142 A | 1/1983 | Frohning et al. |
| 4,440,956 A | 4/1984 | Couvillon |
| 4,454,207 A | 6/1984 | Fraioli et al. |
| 4,456,703 A | 6/1984 | Aldridge |
| 4,499,209 A | 2/1985 | Hoek et al. |
| 4,539,310 A | 9/1985 | Leftin et al. |
| 4,585,798 A | 4/1986 | Beuther et al. |
| 4,595,703 A | 6/1986 | Payne et al. |
| 4,610,975 A | 9/1986 | Baker et al. |
| 4,613,624 A | 9/1986 | Beuther et al. |
| 4,626,521 A | 12/1986 | Murib |
| 4,670,414 A | 6/1987 | Kobylinski et al. |
| 4,717,702 A | 1/1988 | Beuther et al. |
| 4,729,981 A | 3/1988 | Kobylinski et al. |
| 4,801,573 A | 1/1989 | Eri et al. |
| 4,801,620 A | 1/1989 | Fujitani et al. |
| 4,857,559 A | 8/1989 | Eri et al. |
| 4,870,044 A | 9/1989 | Kukes et al. |
| 4,880,763 A | 11/1989 | Eri et al. |
| 4,888,316 A | 12/1989 | Gardner et al. |
| 4,895,816 A | 1/1990 | Gardner et al. |
| 4,957,896 A | 9/1990 | Matsumoto et al. |
| 4,968,660 A | 11/1990 | Tijburg et al. |
| 4,977,126 A | 12/1990 | Mauldin et al. |
| 4,985,387 A | 1/1991 | Prigent et al. |
| 4,988,661 A | 1/1991 | Arai |
| 5,037,792 A | 8/1991 | Luck |
| 5,100,859 A | 3/1992 | Gerdes et al. |
| 5,102,851 A | 4/1992 | Eri et al. |
| 5,110,780 A | 5/1992 | Peters |
| 5,116,801 A | 5/1992 | Luck |
| 5,116,879 A | 5/1992 | Eri et al. |
| 5,268,091 A | 12/1993 | Boitiaux et al. |
| 5,380,697 A | 1/1995 | Matusz et al. |
| 5,552,363 A | 9/1996 | Pannell et al. |
| 5,565,092 A | 10/1996 | Pannell et al. |
| 5,565,400 A | 10/1996 | Holmgren |
| 5,639,798 A | 6/1997 | Wilson et al. |
| 5,744,419 A | 4/1998 | Choudhary et al. |
| 5,851,948 A | 12/1998 | Chuang et al. |
| 5,856,263 A | 1/1999 | Bhasin et al. |
| 5,874,381 A | 2/1999 | Bonne et al. |
| 5,965,481 A | 10/1999 | Durand et al. |
| 5,977,012 A | 11/1999 | Kharas et al. |
| 6,019,954 A | 2/2000 | Tang et al. |
| 6,022,755 A | 2/2000 | Kinnari et al. |
| 6,069,111 A | 5/2000 | Yamamoto et al. |
| 6,075,062 A * | 6/2000 | Zennaro et al. ............ 518/715 |
| 6,100,304 A | 8/2000 | Singleton et al. |
| 6,211,255 B1 | 4/2001 | Schanke et al. |
| 6,235,798 B1 | 5/2001 | Roy et al. |
| 6,255,358 B1 * | 7/2001 | Singleton et al. ............ 518/715 |
| 6,262,132 B1 | 7/2001 | Singleton et al. |
| 6,271,432 B2 | 8/2001 | Singleton et al. |
| 6,284,217 B1 | 9/2001 | Wang et al. |
| 6,365,544 B2 | 4/2002 | Herron et al. |
| 6,465,530 B2 | 10/2002 | Roy-Auberger et al. |
| 6,472,441 B1 | 10/2002 | Kibby |
| 6,486,220 B1 | 11/2002 | Wright |
| 6,486,221 B2 | 11/2002 | Lapidus et al. |
| 6,515,035 B2 | 2/2003 | Roy-Auberger et al. |
| 6,537,945 B2 | 3/2003 | Singleton et al. |
| 6,596,667 B2 | 7/2003 | Bellusi et al. |
| 6,596,781 B1 | 7/2003 | Schinski |
| 6,649,803 B2 | 11/2003 | Mart et al. |
| 6,689,819 B2 | 2/2004 | Bellussi et al. |
| 6,696,502 B1 | 2/2004 | Mart et al. |
| 6,734,137 B2 | 5/2004 | Wang et al. |
| 6,780,817 B1 | 8/2004 | Koyama |
| 6,800,664 B1 | 10/2004 | Espinoza et al. |
| 6,818,589 B1 | 11/2004 | Gillespie |
| 6,822,008 B2 | 11/2004 | Srinivasan et al. |
| 6,825,237 B2 | 11/2004 | Schweitzer et al. |
| 6,835,690 B2 | 12/2004 | Van Berge et al. |
| 6,835,756 B2 | 12/2004 | Font Freide et al. |
| 6,927,190 B2 | 8/2005 | Lok et al. |
| 6,958,310 B2 | 10/2005 | Wang et al. |
| 7,012,103 B2 | 3/2006 | Espinoza et al. |
| 7,012,104 B2 | 3/2006 | Espinoza et al. |
| RE39,073 E | 4/2006 | Herbolzheimer et al. |
| 7,022,644 B2 | 4/2006 | Foong et al. |
| 7,041,866 B1 | 5/2006 | Gillespie |
| 7,045,554 B2 | 5/2006 | Raje et al. |
| 7,067,562 B2 | 6/2006 | Espinoza et al. |
| 7,071,239 B2 | 7/2006 | Ortego et al. |
| 7,078,439 B2 | 7/2006 | Odueyungbo et al. |
| 7,097,786 B2 | 8/2006 | Dindi et al. |
| 7,163,963 B2 | 1/2007 | Fraenkel |
| 7,226,574 B2 | 6/2007 | Long et al. |
| 7,230,035 B2 | 6/2007 | Espinoza et al. |
| 7,253,136 B2 | 8/2007 | Mauldin et al. |
| 7,256,154 B2 | 8/2007 | Moon et al. |
| 7,276,540 B2 | 10/2007 | Espinoza et al. |
| 7,341,976 B2 | 3/2008 | Espinoza et al. |
| 7,351,393 B1 | 4/2008 | Bayense et al. |
| 7,351,679 B2 | 4/2008 | Eri et al. |
| 7,361,626 B2 | 4/2008 | Baijense et al. |
| 7,365,040 B2 | 4/2008 | Van Berge et al. |
| 7,402,612 B2 | 7/2008 | Jin et al. |
| 7,417,073 B2 | 8/2008 | Mauldin et al. |
| 7,422,995 B2 | 9/2008 | Baijense et al. |
| 7,452,844 B2 | 11/2008 | Hu et al. |
| 7,473,667 B2 | 1/2009 | Hagemeyer et al. |
| 7,541,310 B2 | 6/2009 | Espinoza et al. |
| 8,143,186 B2 | 3/2012 | Rytter |
| 8,324,128 B2 | 12/2012 | Rytter et al. |
| 2001/0031793 A1 * | 10/2001 | Singleton et al. ............ 518/715 |

(56) References Cited

U.S. PATENT DOCUMENTS

| | | | |
|---|---|---|---|
| 2001/0032965 | A1 | 10/2001 | Wang et al. |
| 2001/0051588 | A1 | 12/2001 | Herron et al. |
| 2002/0028853 | A1 | 3/2002 | Manzer et al. |
| 2002/0094932 | A1 | 7/2002 | Faber et al. |
| 2002/0131914 | A1 | 9/2002 | Sung |
| 2002/0172642 | A1* | 11/2002 | Dindi et al. ............... 423/651 |
| 2003/0119668 | A1 | 6/2003 | Lok et al. |
| 2003/0158037 | A1 | 8/2003 | Foong et al. |
| 2004/0054016 | A1 | 3/2004 | Lu et al. |
| 2004/0077737 | A1 | 4/2004 | Eri et al. |
| 2004/0110852 | A1 | 6/2004 | Srinivasan et al. |
| 2004/0127585 | A1 | 7/2004 | Raje |
| 2004/0138060 | A1 | 7/2004 | Rapier et al. |
| 2004/0138317 | A1 | 7/2004 | Xie et al. |
| 2004/0180784 | A1 | 9/2004 | Hagemeyer et al. |
| 2004/0204506 | A1 | 10/2004 | Mauldin et al. |
| 2005/0184009 | A1 | 8/2005 | Jansen et al. |
| 2005/0245621 | A1 | 11/2005 | Baijense et al. |
| 2005/0272827 | A1 | 12/2005 | Lok |
| 2006/0009352 | A1 | 1/2006 | Zhao et al. |
| 2006/0167119 | A1 | 7/2006 | Leng et al. |
| 2006/0223693 | A1 | 10/2006 | Fujimoto et al. |
| 2007/0099797 | A1 | 5/2007 | Hu et al. |
| 2007/0161714 | A1 | 7/2007 | Rytter et al. |
| 2008/0064770 | A1 | 3/2008 | Rytter et al. |
| 2008/0255256 | A1 | 10/2008 | Rytter |
| 2010/0022388 | A1 | 1/2010 | Soled et al. |
| 2010/0022670 | A1 | 1/2010 | Soled et al. |
| 2010/0029792 | A1 | 2/2010 | Diehl et al. |
| 2010/0099780 | A1 | 4/2010 | Rytter et al. |
| 2010/0184872 | A1 | 7/2010 | Eri et al. |
| 2013/0199966 | A1 | 8/2013 | Koranne et al. |

FOREIGN PATENT DOCUMENTS

| | | |
|---|---|---|
| EP | 313375 | 4/1989 |
| EP | 690119 | 6/1994 |
| EP | 1129776 | 5/2001 |
| EP | 0736326 | 8/2001 |
| EP | 1445018 | 8/2004 |
| EP | 1632289 | 3/2006 |
| GB | 1183201 | 3/1970 |
| GB | 2053712 | 2/1981 |
| GB | 2 258 826 A | 2/1993 |
| GB | 2416715 | 2/2006 |
| JP | 58139744 | 8/1983 |
| JP | 2003024786 | 1/2003 |
| WO | WO9312879 | 7/1993 |
| WO | WO96/00613 | 1/1996 |
| WO | WO99/42214 | 8/1999 |
| WO | WO99/61143 | 12/1999 |
| WO | WO00/20116 | 4/2000 |
| WO | WO00/25918 | 5/2000 |
| WO | WO 01/36352 A1 | 5/2001 |
| WO | WO01/62381 | 8/2001 |
| WO | WO02/02229 | 1/2002 |
| WO | WO02/47816 | 6/2002 |
| WO | WO02/089978 | 11/2002 |
| WO | WO03/002252 | 1/2003 |
| WO | WO2004/035193 | 4/2004 |
| WO | WO2005/060448 | 7/2005 |
| WO | WO 2005/072866 A1 | 8/2005 |
| WO | WO2006/010936 | 2/2006 |
| WO | WO2006/067285 | 6/2006 |
| WO | WO 2007/093825 A1 | 8/2007 |
| WO | WO2008129034 | 10/2008 |
| WO | WO 2009/118372 A1 | 10/2009 |
| WO | WO2011027104 | 3/2011 |

OTHER PUBLICATIONS

Stevens et al., Qatar Fertilizer Company, in the proceedings of Nitrogen + Syngas 2008 conference conducted in Moscow, pp. 20-23. Apr. 2008.
Catalyst Handbook, 2nd edition, M.V. Twigg, editor Wolfe Publishing, London 1989. pp. 77-81.
Luo et al., "Fischer-Tropsch Synthesis: Group II alkali-earth metal promoted catalysts", Applied Catalysis. pp. 171-181 (2003).
Madikizela et al. Applied Catalysis A: General 272 (2004) 339-346).
International Search Report for International Application No. PCT/GB2010/002111 dated May 25, 2012.
International Search Report for International Application No. PCT/GB01/05461 dated Mar. 1, 2002.
International Search Report for International Application No. PCT/GB03/04873 dated Mar. 25, 2004.
International Search Report for International Application No. PCT/GB2010/001647 dated Nov. 2, 2010.
Application and File History for U.S. Appl. No. 13/510,867 Sep. 24, 2012, inventors Rytter et al.
International Search Report for International Application No. PCT/GB2008/000300 dated Jul. 25, 2008.
Betancourt, P et al., "A Study of the Ruthenium—Alumina System", Applied Catalysis A: General. vol. 170, pp. 307-314 (1998).
Van De Loosdrecht et al., "Calcination of Co-based Fischer-Tropsch Synthesis Catalysts," Topics of Catalysis, vol. 26, Nos. 1-4, pp. 121-127. (Dec. 2003).
Borg, Øyvind et al., "Effect of Calcination Atmosphere and Temperature on $\gamma$-$Al_2O_3$ Supported Colbalt Fischer-Tropsch Catalysts, "Topics in Catalysis, vol. 45, Nos. 1-4, pp. 39-43 (Aug. 2007).
Schulz, "Major and Minor Reactions in Fischer-Tropsch Synthesis on Colbalt Catalysts" Topics in Catalysis, 26 91-4): 73-85 (2003).
Li Fan et al., Supercritical-phase Process for Selective Synthesis of Wax from Syngas: Catalyst and Process Development. Catalysis Today, 36:295-306/ 1997.
ASTM Standard D4058-96, 2001, "Standard Test Method for Attrition and Abrasion of Catalysts and Catalyst Carriers", ASTM Int'l. West Conshohoken, PA. Viewed on Feb. 19, 2009 at http://www.astm.org/DATABASE.CART/HISTORICAL/D4058-96R01.htm.
International Search Report for International Application No. PCT/GB2005/003675 dated Dec. 9, 2005 and GB0421242.9. dated Aug. 17, 2005.
International Search Report for International Application No. PCT/GB2005/000287 dated May 18, 2005 and GB0401829.7 dated May 6, 2005.
Iglesia et al., "Selectivity Control and Catalyst Design in the Fischer-Tropsch Synthesis: Site, Pellets and Reactors", Advances in Catalysis, vol. 3. (1993).
Saib et al., "Silica supported colbalt Fischer-Tropsch catalysts: Effect of Pore Diameter of Support", Catalysis Today, 71: 395-402 (2002).
Tang et al., "Partial Oxidation of Methane of Synthesis Gas Over Alpha-AL2O3-Supported Bimetallic PT-CO Catalysts", Catalysis Letters, Baltzer, Scientific Publ. Basel, CH. vol. 59, No. 2/4. Jun. 1999. pp. 129-135.
Oukaci et al., "Comparison of patented Co. F-T catalysts using fixed-bed and slurry bubble column reactors" Applied Catalysis A: General Elsevier Scienc, Amsterdamn, NL, vol. 186, No. 1-2. Oct. 4, 1999, pp. 120-144.
Iglesia et al., "Reactions-Transport Selectivity Models and the Design of Fischer-Tropsch Catalysts," Computer-Aided Design of Catalysts, Edited by Becker and Pereira. Ch. 7. pp. 199-257. 1993.
Jacobs et al, "Fischer-Tropsch Synthesis XAFS XAFS studies of the effect of water on a PT-promoted $Ca/Al_2O_3$ catalyst", Applied Catalysis, 247:335-343. (2003).
Application and File History for U.S. Appl. No. 10/433,846, filed Nov. 10, 2003, inventors Eri et al.
Application and File History for U.S. Appl. No. 10/535,066, filed Mar. 15, 2006, inventors Rytter et al.
Application and File History for U.S. Appl. No. 10/587,825, filed Feb. 2, 2007 inventors Rytter et al.
Application and File History for U.S. Appl. No. 11/663,663, filed Feb. 14, 2008, inventor Rytter.
Application and File History for U.S. Appl. No. 12/525,070, filed Mar. 26, 2010, inventors Eri et al.
Application and File History for U.S. Appl. No. 12/582,541, filed Oct. 20, 2009, inventor Rytter et al.
Taylor, "An Introduction to Error Analysis", 2nd Ed. (1997). 329 pages. Chs. 1 and 2 provided.
Application and File History for U.S. Appl. No. 13/814,905, filed Apr. 19, 2013, inventors Koranne et al.

* cited by examiner

FISCHER-TROPSCH CATALYSTS

RELATED APPLICATIONS

The present application is a National Phase entry of PCT Application No. PCT/GB2010/001647, filed Aug. 31, 2010, which claims priority from Great Britain Application No. 0915207.5, filed Sep. 1, 2009, which issued as Great Britain Patent No. 2473071 on Sep. 11, 2013, the disclosures of which are hereby incorporated by reference in their entireties.

TECHNICAL FIELD

The present invention relates to supported catalysts and their use in Fischer-Tropsch synthesis reactions, and more specifically to processes for the production of the supported catalyst, and to the supported catalyst itself, as well as activation of the catalyst.

BACKGROUND OF THE INVENTION

Conversion of natural gas to liquid hydrocarbons ("Gas To Liquids" or "GTL" process) is based on a 3 step procedure consisting of: 1) synthesis gas production; 2) synthesis gas conversion by FT synthesis; and 3) upgrading of FT products (wax and naphtha/distillates) to final products.

The Fischer-Tropsch reaction for conversion of synthesis gas, a mixture of CO and hydrogen, possibly also containing essentially inert components like $CO_2$, nitrogen and methane, is commercially operated over catalysts containing the active metals Fe or Co. Iron catalysts are best suited for synthesis gas with low $H_2$/CO ratios (<1.2), e.g. from coal or other heavy hydrocarbon feedstock, where this ratio is considerably lower than the consumption ratio of the FT-reaction (2.0-2.1).

WO 2005/072866 discloses a method of producing an alumina-supported catalyst, which comprises the following steps: a first impregnation step in which an initial alumina support material is impregnated with a source of a 2-valent metal capable of forming a spinel compound with alumina; a first calcination step in which the impregnated alumina support material is calcined at a temperature of at least 550° C. to produce a modified alumina support material; a second impregnation step in which the modified alumina support material is impregnated with a source of catalytically active metal; and a second calcination step in which the impregnated modified support material is calcined at a temperature of at least 150° C. This is then followed by a reduction step to activate the cobalt.

DETAILED DESCRIPTION OF THE INVENTION

The present invention is concerned with Co-based catalysts, in particular, supported Co-based catalysts. A variety of products can be made by the FT-reaction, but from supported cobalt, the primary product is long-chain hydrocarbons that can be further upgraded to products like diesel fuel and petrochemical naphtha. Byproducts can include olefins and oxygenates.

To achieve sufficient catalytic activity, it is customary to disperse the Co on a catalyst carrier, often referred to as the support material. In this way, a larger portion of Co is exposed as surface atoms where the reaction can take place. Suitable support materials include titania, silica, and alumina and various metal oxides and modified aluminas and mixtures thereof. The modified aluminas include addition of stabilization agents, treatment with silanes and other silicon compounds and various acid or base additions or wash procedures. One way of modifying the alumina is to add a divalent metal compound to the alumina or an alumina precursor followed by high temperature treatment. The high temperature treatment is preferably carried out at 700 to 1300° C., more preferably between 900 and 1250° C. The divalent metal compound includes nickel, zinc and magnesium and other metals capable of forming a spinel with alumina.

Supported cobalt catalysts are the preferred catalysts for the FT synthesis. The most important properties of a cobalt FT catalyst are the activity, the selectivity usually to C5 and heavier products and the resistance towards deactivation. The physical strength and chemical robustness of the catalyst and support are also crucial. Normally, the catalyst is deployed in a slurry type, fluidized bed or fixed-bed reactor when used, but other reactor types like a microstructured reactor has been proposed. In a slurry reactor the average catalyst particle size can be between 20 and 200 µm.

Optionally, a promoter can be added, and rhenium is a well known promoter for cobalt Fischer-Tropsch catalysts. Other promoters besides rhenium, specifically, platinum, iridium or ruthenium, can be employed. It is also possible to add a second promoter such as lanthanum oxide or a mixture of oxides of the lanthanides or other compounds which are difficult to reduce.

According to one convenient procedure for making the catalyst, after impregnation of the alumina carrier material with a solution of a cobalt compound, it is dried at e.g. 80-120° C. and calcined at a relatively low temperature of 200 to 450° C., e.g. at 300° C., for 2 to 16 hours. The cobalt is then activated by a reduction step, typically by treating the catalyst with a reducing gas at about 200 to 500° C. at pressures from atmospheric to 20 bar. The reducing gas can be hydrogen, preferably dry hydrogen.

It is an object of the present invention to provide a supported cobalt catalyst which shows an improved selectivity for $C_5$+ hydrocarbons in F-T synthesis.

According to the invention, there is provided a method of producing an activated supported cobalt catalyst, which comprises the following steps: a cobalt impregnation step in which a support material is impregnated with a source of cobalt; a calcination step in which the impregnated support material is calcined to produce a supported catalyst material in oxide form; a first activation step in which the supported catalyst material is treated with a reducing gas; a modifying gas treatment step in which the activated supported catalyst is modified with a modifying gas; and a second activation step in which the modified activated supported catalyst material is treated with a reducing gas.

It has been found that a modifying step, after initial activation of the catalyst, followed by a second activation step, results in a catalyst with increased selectivity to $C_{5+}$ hydrocarbons, without any appreciable detrimental effect on activity.

Before impregnation, the catalyst support may be precalcined at about 500° C. One convenient way of loading active metal and promoter onto the support is by impregnation in one step, but multiple steps can also be employed, from a mixed aqueous solution of appropriate metal salts, generally of cobalt nitrate and perrhenic acid or alternatively ammonium perrhenate. The impregnation technique generally used is the pore filling or "incipient wetness" method, in which the solution is mixed with the dry support until the pores are filled. The definition of the end point of this method may vary somewhat from laboratory to laboratory so that an impregnated catalyst could have a completely dry appearance or a sticky snow-like appearance. However, in no instances would there be any free flowing liquid present when the incipient wetness method is employed.

A number of alternative impregnation procedures are known in the art which use alternative solvents and chemicals, however, in the present invention, the preferred procedure involves aqueous incipient wetness with solutions of cobalt nitrate ($Co(NO_3)_2 \cdot 6\ H_2O$) and perrhenic acid ($HReO_4$). Possible alternatives include using cobalt acetate(s), cobalt carbonate(s) cobalt halide(s), cobalt carbonyl(s), cobalt oxalate(s), cobalt phosphate(s), organic cobalt compounds, ammonium perrhenate, rhenium halide(s), rhenium carbonyl(s), industrial metal salt solutions, organic solvents, etc. The solution may also encompass pH regulating agents, complexing agents, surfactants and other compound(s) that in some way influence the impregnation and following steps. e.g. ammonia or urea can be used. Furthermore, the impregnation technique may encompass all available methods besides incipient wetness, such as precipitation, impregnation from slurry with surplus liquid, chemical vapour deposition etc. It is well known that the impregnation method may influence the dispersion of the active metal (cobalt) and hence the catalytic activity.

The impregnated catalyst is dried, typically at 80-120° C., to remove water from the catalyst pores, and then calcined at typically 200-450° C., e.g. at 300° C. for 2-16 h. The method may include the additional step of impregnating or co-impregnating the support material with a promoter. The promoter may comprise platinum or rhenium. Preferably, the promoter is rhenium and the source of rhenium is selected from perrhenic acid ($HReO_4$), ammonium perrhenate, rhenium halide(s) and rhenium carbonyl(s).

Preferably, the initial support material is alumina and more preferably substantially comprises γ-alumina. Preferably, the initial alumina support material has a specific surface area in the range 100 to 400 $m^2/g$, and a pore volume greater than 0.2 $cm^3/g$, preferably greater than 0.4 $cm^3/g$.

Preferably, prior to the cobalt impregnation step, an initial support material is impregnated with a source a of 2-valent metal capable of forming a spinel phase with alumina in a first impregnation step. Preferably, the source of a 2-valent metal comprises a source of cobalt, zinc, magnesium, manganese, nickel or iron. More preferably, the source of a 2-valent metal comprises nickel or zinc in an amount of less then 25 wt % of the final reduced catalyst, for example, less than 20 wt %, alternatively less than 8 wt %.

Preferably, after the 2-valent metal impregnation step, but prior to the cobalt impregnation step, the impregnated initial support material is calcined. Preferably, the first calcination step is carried out at a temperature in the range 700 to 1300° C., more preferably between 900 and 1250° C. Conveniently, after the first calcination step, the modified alumina support has a surface area of 20 to 80 $m^2/g$.

It should be understood that incorporation of the divalent metal with the initial support material can be carried out in different ways, e.g. by intimate mixing prior to forming a suitable shape of the support. As an example, a modified support suitable for making a cobalt catalyst can be prepared by impregnation of γ-alumina particles with nickel nitrate followed by drying and calcination steps, up to a maximum temperature of 1150-1200° C. During this process, nickel aluminate, a spinel compound, will be formed and possible larger or smaller amounts of α-alumina.

Unmodified γ-alumina may also be used as a support.

The method may include the additional step of incorporating a stablizer into the alumina support material, prior to the cobalt impregnation step. Preferably, the stablizer comprises lanthanum. In preparing the support material, organic or inorganic binders can also be used. Further, in the support preparation, as well as in subsequent steps, great care should be taken to limit the concentration of catalytic poisons for the Fischer-Tropsch reaction to acceptable levels. Such poisons typically encompass alkali metals, alkaline earth metals, sulphur and chloride. Preferably, the first activation step comprises reduction of a substantial portion of the catalytically active metal compound present to the metal. Preferably, the reducing gas used in the first and/or second activation step is hydrogen and the reduction in the first and/or second activation step is carried out at an activation temperature of 200 to 600° C., preferably 300 to 450° C. for both activation steps. However, the preferred reduction temperature will depend on the actual support used and the way of making the oxide catalyst. Sometimes it can be convenient to split the reduction step(s) into further reduction steps or to include polishing by using a lower concentration of hydrogen, e.g. less than 5 vol %, in an inert carrying gas. A polishing step can reduce residual amounts of components from the impregnation such as nitrate. CO can also be used as the reducing gas, either alone or mixed with $H_2$, and the reducing gas can be mixed with inerts like nitrogen, noble gases or steam and suitable temperatures and pressures should be applied. If a fluidized bed reactor is used for activation, it may be convenient to use a recycle of (part of) the reductive gas and a slight atmospheric total overpressure in order to achieve a suitable gas flow. It is also possible to use elevated total pressures, e.g. up to 8 bar or higher, or even the Fischer-Tropsch reactor pressure. Selection of the reduction temperature strongly depends on the actual catalyst formulation, in particular on the presence and nature of promoters. It is well known that Re is highly efficient as a promoter in achieving high reducibilities at a conveniently reduced temperature.

Optimal activation procedures are described in a variety of patents and articles during the last 20 years. Kobylinski et al. (U.S. Pat. No. 4,670,414) describe increased activity of cobalt carbonyl-impregnated catalysts on alumina or silica by subjecting them to (A) reduction in hydrogen, (B) oxidation in an oxygen-containing gas, and (C) reduction in hydrogen, claiming this significantly improved the catalysts performance in Fischer-Tropsch. In another patent (U.S. Pat. No. 4,729,981) Kobylinski et al. describes use of the same method on a cobalt or nickel containing catalyst on refractory metal oxide support. Raje (US 2004/0127585 A1) describes co-feeding parts-per-million quantities of carbon monoxide along with the reducing gas in a slurry to reduce the loss of liquid from the slurry and the production of methane. In another patent (U.S. Pat. No. 7,045,554) Raje describes how low levels of oxygen deactivates the smaller more unstable metal crystallites present in the catalyst matrix, thus giving a more stable catalyst.

The modifying step that follows the first reduction step comprises treatment with a modifying gas, preferably selected from CO, $CO_2$ and steam. The modifying gas can also contain a portion of hydrogen. On a reduced catalyst, CO can decompose to give a carbon deposit. The modifying gas may be considered to provide an oxidative effect. The modifying gas may comprise an oxygen containing gas, such as oxygen and/or air, as an alternative or in addition to CO, $CO_2$ and/or steam.

Preferably, the modifying gas is steam, though it may be a mixture of $H_2$ and CO, in which case the $H_2$/CO ratio is preferably between 1/1 and 10/1, preferably between 2/1 and 5/1. If the modifying gas is a mixture of $H_2$ and CO, a Fischer-Tropsch reaction can be conducted that generates steam in situ, thereby introducing an oxidation potential.

Preferably, the modifying gas treatment step is followed by a treatment with an oxygen containing gas, before the modified activated supported catalyst material is subjected to the second activation step. Preferably, the modifying gas comprises CO and the oxygen containing gas comprises $O_2$ or air. Preferably, in the modifying gas treatment step, the activated supported catalyst is treated with CO under different conditions to the conditions under which it is treated with at least one gas selected from $O_2$, an oxygen containing gas and air.

Preferably, the water content of the modifying gas has a lower limit of at least 2vol %, preferably at least 5vol %, more preferably at least 20vol %.

The modifying gas treatment may be carried out at a temperature in the range 100 to 500° C., preferably 200 to 350° C., and at a pressure in the range of 0 to 40 bar, preferably 1 to 30 bar, in certain embodiments preferably between 10 and 30 bar.

The invention also extends to catalyst material made in accordance with the invention. Conveniently, the cobalt content of the catalyst is from 10 to 40% by weight, preferably from 12 to 25% by weight. The catalyst may incorporate less than 3% by weight of a promoter, preferably less than 0.5 wt %, such as platinum or rhenium.

Amorphous catalyst support materials typically have specific surface areas between 50 and 500 m$^2$/g, more typically between 100 and 400 m$^2$/g. The preferred alumina starting materials used in the present invention are all, at least predominantly, of the γ-alumina type, preferably with specific surface areas between 150 and 200 m$^2$/g. These supports can be prepared by spray-drying techniques of an appropriate solution in order to obtain essentially spherical particles of appropriate size, e.g. 80% in the range between 30-200 μm. After spray-drying, the material is calcined at a high temperature to give the appropriate crystal size and pore structure.

Preferably, the specific surface area of the prepared oxide catalyst, comprising the cobalt oxide on the modified support, is up to 150 m$^2$/g or up to 100 m$^2$/g, and the pore volume of the prepared catalyst is from 0.05 to 0.5cm$^3$/g, preferably 0.1 to 0.4 m$^2$/g. Preferably, the pore diameter of the prepared catalyst is at least 10 nm, preferably 18 nm.

The invention also extends to the use of the catalyst in an F-T synthesis, which may be conducted in a fixed bed reactor or a non-fixed bed reactor, such as a slurry bubble column.

The invention also extends to a process for the production of hydrocarbons which comprise subjecting $H_2$ and CO gases to a Fischer-Tropsch synthesis reaction in a reactor in the presence of a catalyst of the invention. The process can be conducted under typical F-T operating conditions.

Preferably, therefore, the reaction is a three-phase reaction in which the reactants are gaseous, the product is at least partially liquid and the catalyst is solid, and is carried out in a slurry bubble column reactor. Preferably, the $H_2$ and CO are supplied to a slurry in the reactor, the slurry comprising the catalyst in suspension in a liquid including the reaction products of the $H_2$ and CO, the catalyst being maintained in suspension in the slurry at least partly by the motion of the gas supplied to the slurry. The reaction temperature may be in the range 190 to 260° C., preferably 210 to 240° C., and the pressure may be in the range 10 to 60 bar, preferably 15 to 30 bar. The $H_2$/CO ratio of the gas fed to the reactor may be in the range 0.5 to 2.2, preferably 1.2 to 1.95, and the superficial gas velocity may be in the range 5 to 60 cm/s, preferably 20 to 40 cm/s. The products can be subjected to various post-processing operations, such as filtration, de-waxing, hydro-isomerisation and/or hydro-cracking.

The invention will now be illustrated in the following non-limiting examples where all the catalyst testing was performed in a fixed bed laboratory unit with four parallel fixed-bed reactors. Approximately 1 g of catalyst particles in a size fraction between 53 and 90 microns were mixed with 20 g of inert SiC. Reduction was performed in situ at 350° C. for 16 h in hydrogen before the oxidative treatment step and the second reduction step. The subsequent Fischer-Tropsch performance step was carried out in a mixture of hydrogen and CO at a ratio of 2:1. After 20 h on stream at 210° C. and 20 bar total pressure, the space velocity was adjusted to give an estimated conversion level of CO between 45 and 50% after 100 h. It is very important to perform selectivity, as well as activity, comparisons at the same level of conversion, as the level of steam generated in the reaction has a profound influence on the catalyst performance.

Example 1

Table 1 give the results from different catalysts treated with an RSR method, in which the nomination is as follows:

R: Reduction step with hydrogen at 350° C.

S: Oxidation step with steam at 300° C.

The results are given as RSR/R meaning activity and selectivity after RSR treatment relative to ordinary activation with reduction only.

TABLE 1

RSR treated catalysts.

| Catalyst | Relative activity (RSR/R) | Relative selectivity to C5+ (RSR/R) |
|---|---|---|
| 20 Co/0.5 Re on gamma-alumina | 0.89 | 1.03 |
| 12 Co/0.5 Re on alpha-alumina | 0.98 | 0.99 |
| 12 Co/0.5 Re on titania | 0.94 | 1.02 |
| 12 Co/0.5 Re on modified alumina by WO 2005/072866 | 1.04 | 1.05 |

As can be seen, all the catalysts except the one on alpha-alumina react positively to the RSR treatment regarding the selectivity to C5+, while the 12Co/0.5 Re on modified alumina is clearly the best regarding activity, being the only one reacting positive on activity by the RSR treatment.

Example 2

The catalyst made using the method described in WO 2005/072866 is treated by RXR, X being the same or different treatment compared to Example 1. X is described below:

S: Steam at 300° C.

S': Steam and hydrogen at 300° C.

FT 300: hydrogen/carbon monoxide=3 at 300° C.

FT 24: Fischer-Tropsch conditions for 24 h

CO: Carbon monoxide at 300° C.

CO2: Carbon dioxide at 300° C.

O: Air at 300° C.

CO—O: Carbon monoxide at 300° C. followed by air at 300° C.

The results are given in Table 2 as RXR/R meaning activity and selectivity after RXR treatment relative to ordinary activation with reduction only.

TABLE 2

RXR treated catalysts.

| Treatment, X= | Relative activity (RXR/R) | Relative selectivity to C5+ (RXR/R) |
|---|---|---|
| S | 1.04 | 1.05 |
| S' | 1.05 | 1.05 |
| R' (see definition under the table) | 0.98 | 1.03 |
| FT300 | 1.13 | 1.03 |
| FT24 | 1.00 | 1.01 |
| CO | 0.50 | 0.59 |
| CO2 | 1.08 | 1.02 |
| O | 1.13 | 1.00 |
| CO—O | 1.20 | 1.00 |

R' involves only a modified reduction step where steam is added, in other words RSR is combined into a single R' step.

It is seen from Table 2 that the CO treatment gives very different results compared to all others, being detrimental for the catalyst regarding both activity and selectivity. It is further seen from the table that all other treatments improve or stabilize the C5+ selectivity, while there is a greater difference in the impact on activity. The best allover influence of the treatment is with hydrogen/carbon monoxide 3/1 at 300° C. or carbon monoxide followed by calcination in the oxidizing step.

The invention claimed is:

1. A method of producing an activated supported cobalt catalyst, the method comprising the steps of:
    impregnating an initial support material with a source of cobalt to produce an impregnated support material;
    calcining the impregnated support material to produce a supported catalyst material, the supported catalyst material being in an oxide form;
    activating the supported catalyst material with a first reducing gas to produce an activated supported catalyst material;
    treating of the activated supported catalyst material with a modifying gas to produce a modified activated supported catalyst material, wherein the modifying gas is an oxidative gas comprising at least one gas chosen from the group consisting of CO, $CO_2$ and steam, and optionally a portion of hydrogen; and
    activating the modified activated supported catalyst material with a second reducing gas to produce the activated supported cobalt catalyst having a relative activity ratio (RXR/R) greater than 1.00, wherein (RXR) is an activity of the modified activated supported catalyst material and (R) is an activity of the activated supported catalyst material.

2. The method of claim 1, wherein the initial support material is alumina.

3. The method of claim 2, wherein the initial alumina support material at least predominantly comprises γ-alumina.

4. The method of claim 2, wherein the initial alumina support material has a specific surface area in the range 100 to 400 $m^2/g$.

5. The method of claim 2, wherein the initial alumina support material has a pore volume greater than 0.2 $cm^3/g$.

6. The method of claim 2, further comprising incorporating a stabilizer into the initial alumina support material prior to the cobalt impregnation step.

7. The method of claim 6, wherein the stabilizer comprises lanthanum.

8. The method of claim 1, further comprising impregnating the initial support material with a 2-valent metal source prior to the cobalt impregnation step.

9. The method of claim 8, wherein the 2-valent metal source comprises cobalt, zinc, magnesium, manganese, nickel or iron.

10. The method of claim 9, wherein the 2-valent metal source comprises nickel in an amount of less than 20 wt % of the final reduced catalyst.

11. The method of claim 8, wherein the 2-valent metal source comprises nickel or zinc in an amount of less than 8 wt % of the final reduced catalyst.

12. The method of claim 8, further comprising calcining the initial support material after the 2-valent metal impregnation step and prior to the cobalt impregnation step.

13. The method of claim 12, wherein the calcination step after the 2-valent metal impregnation step and prior to the cobalt impregnation step is carried out at a temperature in the range of 900 to 1250° C.

14. The method of claim 1, further comprising impregnating or co-impregnating the initial support material or the modified activated supported catalyst material with a promoter.

15. The method of claim 14, wherein the promoter comprises platinum or rhenium.

16. The method of claim 14, wherein the promoter is rhenium chosen from the group consisting of perrhenic acid ($HReO_4$), ammonium perrhenate, rhenium halide, rhenium halides, rhenium carbonyl and rhenium carbonyls.

17. The method of claim 1, wherein the cobalt impregnation step comprises an incipient wetness treatment in which an aqueous solution of cobalt is mixed with the initial support material until the pores are filled, and the impregnated support material is then dried prior to the calcining step.

18. The method of claim 17, wherein the aqueous solution of cobalt is chosen from the groups consisting of cobalt nitrate ($Co(NO_3)_2$), a cobalt acetate, cobalt acetates, a cobalt halide, cobalt halides, a cobalt carbonyl, cobalt carbonyls, a cobalt oxalate, cobalt oxalates, a cobalt phosphate, cobalt phosphates, a cobalt carbonate, cobalt carbonates, a cobalt (hexa) amine salt, cobalt (hexa)amine salts, and organic cobalt compounds.

19. The method of claim 17, wherein the drying is carried out at 80 to 120° C.

20. The method of claim 1, wherein the activation of the supported catalyst material step comprises reduction of a substantial portion of the catalytically active metal compound present to the metal.

21. The method of claim 1, wherein the first reducing gas and the second reducing gas is hydrogen.

22. The method of claim 1, wherein the activation of the supported catalyst material step, the activation of the modified activated supported catalyst material step, or both the activation of the supported catalyst material step and the activation of the modified activated supported catalyst material step is carried out at an activation temperature of 200 to 600° C.

23. The method of claim 22, wherein both activation steps are carried out at the activation temperature in the range of 300 to 450° C.

24. The method of claim 1, wherein the modifying gas further comprises the portion of hydrogen.

25. The method of claim 24, wherein the modifying gas comprises $H_2$ and CO.

26. The method of claim 25, wherein the $H_2$/CO ratio is between 1/1 and 10/1.

27. The method of claim 1, wherein the modifying gas comprises an oxygen containing gas.

28. The method of claim 1, further comprising treating the modified activated support catalyst material with an oxygen containing gas prior to the activation of the modified supported catalyst material step.

29. The method of claim 28, wherein the modifying gas comprises CO and the oxygen containing gas comprises $O_2$ or air.

30. The method of claim 29, wherein the modifying gas treatment step in which the activated supported catalyst material is modified with CO is under different conditions than the treatment step in which the activated supported catalyst material is treated with the oxygen containing gas.

31. The method of claim 1, wherein the modifying gas has a water content of at least 2 vol %.

32. The method of claim 1, wherein the in which the modifying gas treatment step is carried out at a temperature in the range 100 to 500° C.

33. The method of claim 1, wherein the modifying gas treatment step is carried out at a pressure in the range of 0 to 40 bar.

* * * * *